(12) United States Patent
Jimenez et al.

(10) Patent No.: US 11,225,595 B2
(45) Date of Patent: Jan. 18, 2022

(54) CONTROL HEAT OF HYDRATION BY CHARACTERIZING CEMENTITIOUS COMPONENTS

(71) Applicant: Halliburton Energy Services, Inc., Houston, TX (US)

(72) Inventors: Walmy Cuello Jimenez, Houston, TX (US); Xueyu Pang, Tomball, TX (US); John Paul Bir Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 195 days.

(21) Appl. No.: 16/479,040

(22) PCT Filed: Feb. 22, 2017

(86) PCT No.: PCT/US2017/018947
§ 371 (c)(1),
(2) Date: Jul. 18, 2019

(87) PCT Pub. No.: WO2018/156122
PCT Pub. Date: Aug. 30, 2018

(65) Prior Publication Data
US 2019/0330513 A1    Oct. 31, 2019

(51) Int. Cl.
*E21B 33/13* (2006.01)
*B28C 7/02* (2006.01)
(Continued)

(52) U.S. Cl.
CPC .............. *C09K 8/467* (2013.01); *B28C 7/02* (2013.01); *C04B 7/02* (2013.01); *C04B 7/43* (2013.01);
(Continued)

(58) Field of Classification Search
None
See application file for complete search history.

(56) References Cited

U.S. PATENT DOCUMENTS 7,607,484 B2    10/2009    Roddy et al.
7,631,692 B2    12/2009    Roddy et al.
(Continued)

FOREIGN PATENT DOCUMENTS

EP    2933307    10/2015
KR    101136868    4/2012
(Continued)

OTHER PUBLICATIONS

Shanahan Natallia et al: "Heat of hydration prediction for blended cements", Journal of Thermal Analysis and Calorimetry, Kluwer, Dordrecht, NL, vol. 128, No. 3, Dec. 29, 2016 (Dec. 29, 2016), pp. 1279-1291, XP036234189, ISSN: 1388-6150 (Year: 2016).*
(Continued)

*Primary Examiner* — Charles R Nold
(74) *Attorney, Agent, or Firm* — Thomas Rooney; C. Tumey Law Group PLLC

(57) ABSTRACT

Methods of wellbore cementing are provided. A method of designing a cement composition may include: selecting a target heat of hydration for a target time and temperature; selecting one or more cementitious components and a weight percent for each of the one or more cementitious components such that a sum of a heat of hydration of the one or more cementitious components is less than or equal to the target heat of hydration; preparing the cement composition; and allowing the cement composition to set.

19 Claims, 2 Drawing Sheets

(51) Int. Cl.

| | | |
|---|---|---|
| *C09K 8/467* | (2006.01) | |
| *C04B 7/02* | (2006.01) | |
| *E21B 47/07* | (2012.01) | |
| *C04B 7/43* | (2006.01) | |
| *C09K 8/46* | (2006.01) | |
| *C09K 8/42* | (2006.01) | |
| *C04B 111/00* | (2006.01) | |

(52) U.S. Cl.
CPC ............... *C09K 8/42* (2013.01); *C09K 8/46* (2013.01); *E21B 33/13* (2013.01); *E21B 47/07* (2020.05); *C04B 2111/00448* (2013.01)

(56) References Cited

U.S. PATENT DOCUMENTS

| | | |
|---|---|---|
| 7,806,183 B2 | 10/2010 | Roddy et al. |
| 7,892,352 B2 | 2/2011 | Roddy et al. |
| 8,281,859 B2 | 10/2012 | Roddy et al. |
| 8,333,240 B2 | 12/2012 | Roddy et al. |
| 8,486,869 B2 | 7/2013 | Brenneis et al. |
| 8,551,242 B2 | 10/2013 | Brothers et al. |
| 8,609,592 B2 | 12/2013 | Guenthenspberger et al. |
| 8,851,173 B2 | 10/2014 | Brothers et al. |
| 8,997,578 B2 | 4/2015 | Morgan et al. |
| 9,023,150 B2 | 5/2015 | Brenneis et al. |
| 9,212,534 B2 | 12/2015 | Ballew et al. |
| 9,505,972 B2 | 11/2016 | Iverson et al. |
| 9,644,132 B2 | 5/2017 | Morgan et al. |
| 10,370,579 B2 | 8/2019 | Agapiou et al. |
| 2009/0145602 A1 | 6/2009 | Reddy et al. |
| 2013/0008353 A1 | 1/2013 | Brothers et al. |
| 2014/0332216 A1 | 11/2014 | Ravi et al. |
| 2017/0364607 A1 | 12/2017 | Kaushik et al. |

FOREIGN PATENT DOCUMENTS

| | | |
|---|---|---|
| KR | 101148655 | 5/2012 |
| RU | 2464408 | 10/2012 |
| RU | 2507379 | 2/2014 |
| WO | 2009071866 | 6/2009 |

OTHER PUBLICATIONS

Sedaghat, "Cement Heat of Hydration and Thermal Control"; Graduate Theses and Dissertations", University of South Florida Scholar Commons", pp. 1-143, Mar. 22, 2016. (Sedaghat). (Year: 2016).*

Chinese Office Action and Search Report with English Translation for Application No. 201780085419.3 dated Oct. 10, 2020.

ISRWO International Search Report and Written Opinion for PCT/US2017/018947 dated Jun. 15, 2017.

Chinese Office Action and Search Report with English Translation for Application No. 201780085419.3 dated May 18, 2020.

Russian Search Report and Office Action with Partial English Translation for Application No. 2019123301 dated Jun. 5, 2020.

* cited by examiner

CONTROL HEAT OF HYDRATION BY CHARACTERIZING CEMENTITIOUS COMPONENTS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition while controlling the heat generated from the cement setting. Excessive heat formation may lead to a weakened set cement due to the formation of cracks and imperfections in the cement. The importance of the generated heat may be especially important in high severity applications such as in permafrost regions and in applications with gas hydrates.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
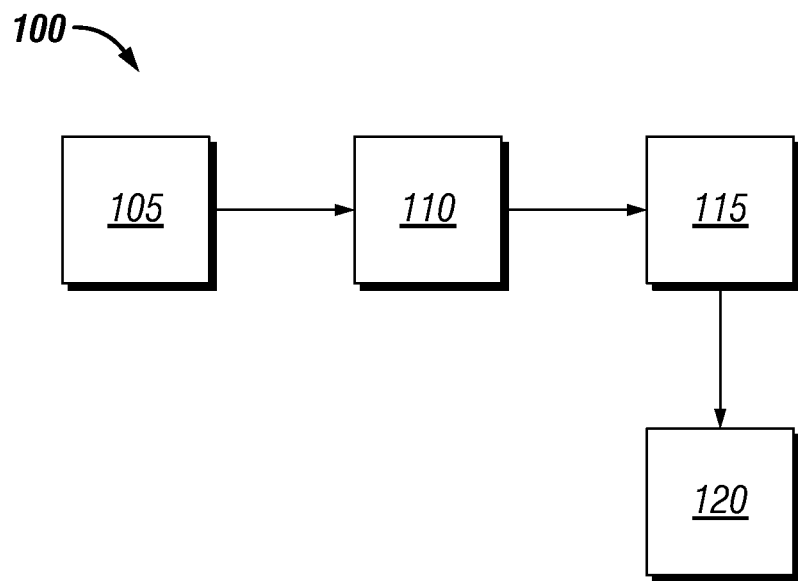
FIG. 1 is a schematic illustration of an example system for analyzing cementitious components.

The present disclosure may generally relate to cementing methods and systems. Without limitation, provided herein are methods of identifying and categorizing silica sources, cements, and other cementitious components based on physiochemical properties. The physiochemical properties of each cementitious component of a cement composition may affect the final set mechanical properties of the slurry as well as the dynamic or time based properties such as mixability, rheology, viscosity, and others. As used herein, cementitious component means any mineral or chemical that is capable of participating in one or more cementitious reactions. One physiochemical property of particular interest may be the heat of hydration and the effects of each cementitious component on the heat of hydration. Using the techniques described herein, a cement composition with a tailored heat of hydration may be generated that is suited to a particular application.

When a cement composition is mixed with water, heat is released from hydration of the cementitious materials and the cementitious reactions that take place. The exothermic reaction between Portland cement and water, for example, may raise the temperature of the setting cement composition significantly. The increased temperature may have many effects such as increased rate of setting and volumetric expansion, among others. In some cement applications, such as wellbore applications, the heat generated may dissipate into the casing and formation. In applications where a relatively larger diameter of cement is required, the heat may not dissipate quickly enough and the internal temperature of the cement composition may rise sharply. If the temperature rise is significantly high and the cement composition undergoes non-uniform or rapid cooling during setting, thermal cracking may occur in the cement composition. The potential for thermal cracking may depend of factors such as the cement composition's tensile strength, and coefficient of thermal expansion, among others. In extreme temperature applications such as permafrost, the cement composition may lose heat to the environment before fully setting. The loss of heat may lead to a slow setting cement or one that does not fully set. Tailoring the heat of hydration may allow the heat released to be enough to overcome the heat loss to the environment to enable a more favorable curing temperature.

Suitable cement compositions generally may comprise water and a cementitious component, such as Portland cement. In some examples, a cement composition may further comprise at least one other cementitious component. The cement compositions may have a density suitable for a particular application, including, but not limited to, a density in the range of about 8 pounds per gallon ("ppg") to about 16 ppg (1 g/cm$^3$ to 1.9 g/cm$^3$). In the foamed examples, the foamed cement compositions of the present invention may have a density in the range of about 8 ppg to about 13 ppg (1 g/cm$^3$ to 1.6 g/cm$^3$) (or even lower). As desired, the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, should recognize the appropriate density for a particular application.

The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable slurry, including, but not limited to, a range of about 40% to about 200% by weight of cementitious components ("bwoc") present in the cement composition. As used herein, the term "cementitious component" refers to materials that possess cementitious properties, such as materials with hydraulic or pozzolanic activity, including Portland cement and the silica source, among others. For the purposes of this disclosure, lime is also considered a cementitious component as it reacts with the silica source in the pozzolanic reaction. In some examples, the water may be included in an amount in the range of about 40% to about 150% bwoc. Those of ordinary skill in the art, with the benefit of this disclosure, should be able to select an appropriate amount and type of water for a particular application.

Any of a variety of Portland cements may be suited for use in the present disclosure, including those classified as Classes A, C, G, and H cements according to American Petroleum Institute, API Specification for Materials and Testing for Well Cements, API Specification 10, Fifth Ed., Jul. 1, 1990. In addition, in some examples, cements suitable for use in the present invention may be classified as ASTM Type I, II, or III. Cement compositions that may be considered "low Portland" may be designed by use of the techniques disclosed herein in that the cement compositions may comprise Portland cement in an amount of about 50% or less by weight of cementitious components ("bwoc") present in the composite cement composition. The Portland cement may be present in the cement compositions in any suitable amount, including in the range of about 0% to about 100% bwoc. In some examples, the Portland cement may be present in an amount ranging between any of and/or including any of about 1%, about 5%, about 10%, about 20%, about 40%, about 50%, about 60%, about 70%, about 80%, about 90%, or about 100% bwoc. Cement compositions may also be designed that are free (or essentially free) of Portland cement. Those of ordinary skill in the art, with the benefit of this disclosure, should be able to select an appropriate amount of Portland cement for a particular application.

The cement compositions may further comprise a silica source. As used herein, the term "silica source" refers to a material that dissolves or otherwise dissociates to provide silicic acid that can react to form a cement product. By inclusion of the silica source, a different path may be used to arrive at a similar product as from Portland cement. Without limitation, a pozzolanic reaction may be induced wherein silicic acid ($H_4SiO_4$) and portlandite ($Ca(OH)_2$) react to form a cement product (calcium silicate hydrate). If other compounds, such as, aluminate, are present in the silica source, additional reactions may occur to form additional cement products, such as calcium aluminate hydrates. Calcium hydroxide necessary for the reaction may be provided from other cementitious components, such as Portland cement, or may be separately added to the cement composition. Examples of suitable silica sources may include, but are not limited to, fly ash, slag, silica fume, crystalline silica, silica flour, cement kiln dust ("CKD"), zeolite, agricultural waste ash, and natural pozzolans, among others. Certain of these silica sources will be discussed in more detail below. Suitable silica sources may be generally classified as into three general categories including mined materials, waste materials, and bio-ashes. Mined materials are natural silica sources generally present in the Earth's surface. Waste materials may generally be waste materials from industrial sources. Bio-ashes may generally be the product of intentional combustion of agricultural, municipal, and industrial organic wastes. Bio-ashes may include, but are not limited to, agricultural waste ash, such as rice husk ash, sugar cane ash, and bagasse ash. Furthermore, in certain examples of the cement compositions disclosed herein, the pozzolan may comprise a mixture of one or more pozzolans.

An example of a suitable silica source may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions may be necessary for a composite cement composition comprising Class F fly ash. Where used, lime may be mixed with Class F fly ash in an amount in the range of about 0.1% to about 100% by weight of the fly ash. In some instances, the lime may be hydrated lime. Suitable examples of fly ash comprise, but are not limited to, POZMIX® A cement additive, commercially available from Halliburton Energy Services, Inc., Houston, Tex.

Another example of a suitable silica source may comprise slag. Slag is generally a by-product in the production of various metals from their corresponding ores. By way of example, the production of cast iron can produce slag as a granulated, blast furnace by-product with the slag generally comprising the oxidized impurities found in iron ore. Slag generally does not contain sufficient basic material, so slag may be used with a base to produce a settable composition that may react with water to set to form a hardened mass. Examples of suitable sources of bases include, but are not limited to, sodium hydroxide, sodium bicarbonate, sodium carbonate, lime, and combinations thereof.

Another example of a suitable silica source may comprise silica fume. Silica fume may alternatively be referred to as "microsilica" or "condensed silica fume." Silica fume is generally a byproduct material that may be obtained, for example, by reduction of quartz with coal in the manufacture of certain alloys. Silica fume may be processed after recovery, for example, to control particle size. Silica fume may be extremely fine, for example, with a mean particle size of less than 1 micron and, alternatively, less than 0.2 microns. The mean particle size, as used herein, corresponds to d50 values as measured by particle size analyzers such as those manufactured by Malvern Instruments, Worcestershire, United Kingdom. Silica fume may have a high surface area and is generally available in either a powder form or liquid.

Another example of a suitable silica source may comprise CKD. Cement kiln dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal.

Another example of a suitable silica source may comprise zeolite. Zeolites generally are porous alumino-silicate minerals that may be either a natural or synthetic material. Natural zeolites may be mined from the Earth's surface. Synthetic zeolites may also be used, which are lab created. Synthetic zeolites are based on the same type of structural cell as natural zeolites, and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may comprise zeolite in combination with a cation such as $Na^+$, $K^+$, $Ca^{2+}$, $Mg^{2+}$, etc. Zeolites comprising cations such as sodium may also provide additional cation sources to the cement composition as the zeolites dissolve.

Another example of a silica source may comprise an agricultural waste ash. Examples of agricultural waste ash that may be used in the composite cement composition comprise, for example, wood (e.g., sawdust, bark, twigs, branches, other waste wood) ash, tree leave ash, corn cob ash, rice hull ash, cane (e.g., sugar cane) ash, bagasse ash, grain (e.g., amaranth, barley, corn flaxseed, millet, oat, quinoa, rye, rice, wheat etc.) and related by-product(s) (e.g., husks, hulls, etc.) ash, orchard ash, vine trimming ash, grass (e.g., Korai, Tifton, native shiba, etc.) ash, straw ash, ground nut shell ash, legume (e.g., soybean) ash, and combinations thereof.

Another example of a suitable pozzolan may comprise natural pozzolans. Natural pozzolans are generally present on the Earth's surface and may exhibit pozzolanic activity. Suitable natural pozzolans may comprise volcanic rock, diatomaceous earth, tuff, metakaolin, calcined clays, shale (e.g., calcined shale, opaline shale, etc.), and combinations thereof. The natural pozzolans may be ground or unground. Natural pozzolans may comprise materials, such as calcined clays, metakaolin, and calcined shale, which have been heat treated, for example, in a kiln to enhance their pozzolanic activity. Generally, the natural pozzolans may have any particle size distribution as desired for a particular application including, but not limited to, a mean particle size in a range of from about 0.1 microns to about 200 microns, or even smaller. In specific examples, the natural pozzolans may have a mean particle size in a range of from about 1 micron to about 200 micron, from about 5 microns to about 100 microns, or from about 10 micron to about 50 microns. One of ordinary skill in the art, with the benefit of this disclosure, should be able to select a natural pozzolan and particle size suitable for use for a chosen application.

Any of the previously mentioned silica sources may be present in the cement compositions in any suitable amount, including, but not limited to, an amount in the range of about 10% to about 100% bwoc, from about 50% to about 100% bwoc, from about 50% to about 80% bwoc, or from 80% about 100% bwoc. In some examples the silica source may be present in an amount ranging between any of and/or including any of about 1%, about 5%, about 10%, about 20% a, about 40%, about 60%, about 80%, or about 90% bwoc. Those of ordinary skill in the art, with the benefit of this disclosure, should be able to select an appropriate type and amount of silica source for a particular application.

The cement compositions may further comprise lime. Lime may be present in the cement composition in different forms, including as calcium oxide and/or calcium hydroxide. As used herein, the term "lime" is intended to include both calcium oxide and calcium hydroxide. Calcium hydroxide is also commonly referred to as hydrated lime and slaked lime. In some examples, the hydrated lime may be provided as quicklime (calcium oxide) which hydrates when mixed with water to form the hydrated lime. In addition the addition of lime as a separate component, at least a portion of the lime in cement composition may be also provided from other cementitious components. For example, the hydraulic reaction of Portland cement with water may release hydrated lime into the cement composition. In addition, the silica sources may also contain lime or release lime into the cement composition. Lime present in a silica source as CaO may be referred to as free lime if it is not bound to other minerals. The hydrated lime may be included in examples of the cement compositions, for example, to react with the silica source. Where present, the lime may be included in the cement compositions in an any suitable amount, including, but not limited to, an amount in the range of from about 10% a to about 100% bwoc, for example. In some examples, the hydrated lime may be present in an amount ranging between any of and/or including any of about 10%, about 20%, about 40%, about 60%, about 80%, or about 100% bwoc. One of ordinary skill in the art, with the benefit of this disclosure, should recognize the appropriate amount of hydrated lime to include for a chosen application.

The cement composition may further comprise other additives suitable for use in cementing operations. Examples of such additives include, but are not limited to: weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, dispersants, thixotropic additives, suspending agents, and combinations thereof. One of ordinary skill in the art, with the benefit of this disclosure, should be able to select an appropriate additive for a particular application.

The cement compositions may be prepared using any suitable technique. The cementitious components, such as the Portland cement, silica source, cement additives, and/or lime may be dry blended prior to combination with the water to form the cement composition. This dry blend may be prepared offsite and then transported to the well site, for example, where it may be combined with the water. Additional solid cement additive may also be included in the dry blend. Other suitable techniques may be used for preparation of the cement compositions as should be appreciated by those of ordinary skill in the art in accordance with the present disclosure.

Reactivity mapping is the process of using laboratory techniques to analyze the physiochemical properties of a cementitious component and generate predictive maps and models of the behavior of a component in a cement composition. Reactivity mapping may comprise several steps. One step may comprise measuring the physical and chemical properties of different materials through standardized tests. Another step may comprise categorizing the materials through analysis of data collected and the predicted effect on cement slurry properties. Yet another step may comprise utilizing the data to estimate material reactivity, optimizing cement performance, predicting blend mechanical properties mathematically based on analytical results, and/or predict slurry density dependence of compressive strength.

Measuring physical and chemical properties of each selected cementitious component may comprise many laboratory techniques and procedures including, but not limited to, microscopy, spectroscopy, x-ray diffraction, x-ray fluorescence, particle size analysis, water requirement analysis, scanning electron microscopy, energy-dispersive X-ray spectroscopy, surface area, specific gravity analysis, thermogravimetric analysis, morphology analysis, infrared spectroscopy, ultraviolet-visible spectroscopy, mass spectroscopy, secondary ion mass spectrometry, electron energy mass spectrometry, dispersive x-ray spectroscopy, auger electron spectroscopy, inductively coupled plasma analysis, thermal ionization mass spectroscopy, glow discharge mass spectroscopy x-ray photoelectron spectroscopy, mechanical property testing, Young's Modulus testing, rheological properties, Poisson's Ratio. One or more of the preceding tests may be consider API tests, as set forth in the API recommended practice for testing well cements (published as ANSI/API recommended practice 10B-2). Additional API tests not specifically listed above may also be used for the measurements. The physical and chemical properties may be measured for a group of cementitious components. Two or more of the cement components measured may be different types of cementitious components (e.g., volcanic rock, CKD, fly ash, etc.). Two or more of the cementitious components may be the same type but from different sources (e.g., volcanic rock from source 1, volcanic rock from source 2, etc.).

X-ray powder diffraction is one analysis technique that may be used for measuring the physical and chemical properties of the cementitious components. X-ray powder diffraction is a technique of exposing a sample to x-rays, neutrons, or electrons and measuring the amount of interatomic-diffraction. The sample acts a diffraction grating thereby producing a differing signal at different angles. The typical properties that may be measured are the phase identification for the identification and characterization of a crystalline solid. Other properties may be crystallinity, lattice parameters, expansion tensors, bulk modulus, and phase transitions.

X-ray fluorescence is another analysis technique that may be used for measuring the physical and chemical properties of the cementitious components. X-ray fluorescence may use short wave x-rays to ionize atoms in a sample thereby causing them to fluoresce at certain characteristic wavelengths. The characteristic radiation released by a sample may allow accurate identification of the component atoms in the sample as well as their relative amounts.

Particle size analysis is another analysis technique that may be used for measuring the physical and chemical properties of the cementitious components. Particle size analysis may be accomplished through analysis by various laboratory techniques including but not limited to laser diffraction, dynamic light scattering, static image analysis, and dynamic image analysis. Particle size analysis may also provide information about the morphology of a particular sample. Morphology may include parameters such as sphericity and roundness as well as the general shape of a particle such as disk, spheroid, blade, or roller. With a knowledge of the morphology and particle size, the average surface area and volume may be estimated. Surface area and volume may be important in determining the water requirement as well as reactivity. In general, a relatively smaller particle size may react more quickly than a relatively larger particle size. Also the relatively smaller particle size may have a greater water requirement to completely hydrate than a relatively larger particle size.

Energy dispersive x-ray spectroscopy is another analysis technique that may be used for measuring the physical and chemical properties of the cementitious components. Energy dispersive x-ray spectroscopy is an analytical technique used to analyze the elements present in a sample and determine the chemical characterization of a sample. Other techniques may include Fourier transform infrared spectroscopy, ultraviolet-visible spectroscopy, mass spectroscopy, secondary ion mass spectrometry, electron energy mass spectrometry, dispersive x-ray spectroscopy, auger electron spectroscopy, and x-ray photoelectron spectroscopy. The techniques listed herein may identify the chemical components of a sample, for example the mineral composition, as well as the amounts of each component in the sample.

The cementitious components may be analyzed to determine their specific surface area. Specific surface area generally refers to the total surface area and may be reported as the total surface area per unit mass. Values obtained for specific area are dependent on the analysis technique. Any suitable analysis technique may be used, including without limitation adsorption based methods such as Brunauer-Emmett-Teller (BET) analysis, methylene blue staining, ethylene glycol monoethylene ether adsorption, and a protein-retention method, among other.

Thermogravimetric analysis is another analysis technique that may be used for measuring the physical and chemical properties of the cementitious components. Thermogravimetric analysis is a method of thermal analysis wherein changes in physical and chemical properties of a sample may be measured. In general the properties may be measured as a function of increasing temperature, such as with a constant heating rate, or as a function of time with a constant temperature or a constant mass change. Properties determined by thermogravimetric analysis may include first-order phase transitions and second-order phase transitions such as vaporization, sublimation, adsorption, desorption, absorption, chemisorption, desolvation, dehydration, decomposition, oxidation and reduction reactions, ferromagnetic transition, superconducting transition, and others.

Compressive strength is generally the capacity of a material or structure to withstand axially directed pushing forces. The compressive strength of the cementitious component may be measured at a specified time after the cementitious component has been mixed with water and the resultant cement composition is maintained under specified temperature and pressure conditions. For example, compressive strength can be measured at a time in the range of about 24 to about 48 hours (or longer) after the fluid is mixed and the fluid is maintained at a temperature of from 100° F. to about 200° F. and atmospheric pressure. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann® Instrument Company, Houston, Tex. Compressive strengths may be determined in accordance with API RP 10B-2, *Recommended Practice for Testing Well Cements*, First Edition, July 2005.

Tensile strength is generally the capacity of a material to withstand loads tending to elongate, as opposed to compressive strength. The tensile strength of the cementitious component may be measured at a specified time after the cementitious component has been mixed with water and the resultant cement composition is maintained under specified temperature and pressure conditions. For example, tensile strength can be measured at a time in the range of about 24 to about 48 hours (or longer) after the fluid is mixed and the fluid is maintained at a temperature of from 100° F. to about 200° F. and atmospheric pressure. Tensile strength may be measured using any suitable method, including without limitation in accordance with the procedure described in ASTM C307. That is, specimens may be prepared in briquette molds having the appearance of dog biscuits with a one square inch cross-sectional area at the middle. Tension may then be applied at the enlarged ends of the specimens until the specimens break at the center area. The tension in pounds per square inch at which the specimen breaks is the tensile strength of the material tested.

Young's modulus also referred to as the modulus of elasticity is a measure of the relationship of an applied stress to the resultant strain. In general, a highly deformable (plastic) material will exhibit a lower modulus when the confined stress is increased. Thus, the Young's modulus is an elastic constant that demonstrates the ability of the tested material to withstand applied loads. A number of different laboratory techniques may be used to measure the Young's modulus of a treatment fluid comprising a cementitious component after the treatment fluid has been allowed to set for a period of time at specified temperature and pressure conditions.

Calorimetry may be a technique used to analyze the cement compositions and components. Calorimetry refers to the science of measuring heat transfer in a physical or chemical reaction. Suitable calorimeters may include adiabatic calorimeters, reaction calorimeters such as heat flow calorimeters, heat balance calorimeters, power compensation calorimeters, or constant flux calorimeters, bomb calorimeters, constant-pressure calorimeters, and differential scanning calorimeters, among others. A cement sample may be introduced into the chosen calorimeter and allowed to set or hydrate. Data about the heat released versus time may be gathered.

A technique for analyzing the heat of hydration of a particular mix of cementitious components, for example fly ash, lime, Portland cement, and water, may comprise first forming a baseline with pure Portland cement and water. A slurry of Portland and water may be tested in a suitable calorimeter to study the heat generated over time. A second test may comprise replacing a portion of the Portland with fly ash and lime, for example about 10%, and then performing another calorimetric test. A third test may be performed that reduces the amount of Portland again. The process of replacing a portion of Portland may be carried out repeatedly until the mix is just lime, fly ash, and water. The method may then be repeated for another cementitious component such as Portland, slag, and lime for example. The contribution of each cementitious component to the overall heat of hydration may then be determined, such as by performing a multi-linear regression analysis.

Data about each cementitious component may be stored in a database. Data may include the total heat generated by each component, the rate of heat generation, and any other data gathered during the calorimetry tests. Although only some select laboratory techniques may have been mentioned, it should be understood that there are many analytical techniques that may be appropriate or not appropriate for a certain sample. One of ordinary skill in the art with the benefit of this disclosure should be able to select an appropriate analytical technique to determine a certain property of interest.

The heat of hydration of a cement composition may be approximated as the sum of the heat of hydration of each component.

$$HOH_{composite} = \Sigma HOH_i$$

A cement slurry may be tailored to have a specific heat of hydration since the heat of hydration of the individual components is known from previous testing. In particular, a cement composition may be selected to have a certain 24 hour heat of hydration and a 48 hour heat of hydration. The time dependent temperature of the cement composition may also be determined from the rate of heat generation, the total heat of hydration, and physical properties such as heat capacity and heat transfer coefficients. As previously mentioned, in some high severity wells such as those comprising gas hydrates and permafrost may require specialized cement compositions. In applications such as gas hydrates and permafrost, a cement composition comprising a relatively lower heat of hydration may be required to reduce or diminish cement hydration effects on the well. Using the techniques disclosed herein a cement operator or engineer may blend a cement composition with a tailored heat of hydration for a specific purpose. In some wells, it may be advantageous to have a high heat of hydration as a higher heat of hydration may in general mean a quicker setting cement. A cement that is tailored to have a high heat of hydration may require less amounts of cement set accelerator. In another examples, a cement comprising a low heat of hydration and may set relatively slower thus reducing the amount of cement set retarder. Tailoring the heat of hydration may reduce the amount of additives used and may reduce cost of the cement.

A method of using the heat of hydration to design a cement composition may comprise selecting a target heat of hydration. The heat of hydration contribution of each of the components of the cement composition may sum to less than the target heat of hydration. In more sensitive operations such as in the example of gas hydrates, the heat of hydration of the cement composition may be lower than the target maximum allowed heat of hydration. A heat of hydration that is lower than the maximum target heat of hydration may be achieved by selecting a weight percent for each of the cementitious components such that the sum contribution from each cement component is less than or equal to the maximum target heat of hydration. Additionally there may be a maximum temperature allowed. The maximum temperature, or peak temperature, reached may be controlled by selecting a weight percent for each of the cementitious components such that the temperature does not reach the maximum allowed. A cementitious component may react and output a set amount of heat per unit mass of material. The temperature reached by the material may be dependent on factors such as the heat transfer coefficient, the surface area that the heat may flux through, temperature of the wellbore, and other factors well understood by those in the art. The temperature of a composition may be controlled by selecting materials that output heat slower such that the heat generated may be removed by conduction. In some examples, a target temperature or maximum temperature may be selected and the composition may be tailored to meet the target or maximum temperature. In another example, the composition may be tailored such that the temperature reached is less than a target or maximum temperature. The peak temperature of a composition may also be calculated by the techniques previously described.

Using the techniques previously described, data about the silica content, particle size, surface area, and composition may be used to predict the heat of hydration and the time dependent characteristics of the heat of hydration of a cement mixture. Without limitation, a pozzolanic reaction may be induced wherein silicic acid ($H_4SiO_4$) and portlandite ($Ca(OH)_2$) react to form a cement product (calcium silicate hydrate). The pozzolanic reaction between silicic acid ($H_4SiO_4$) and portlandite may progress according to the following equations. First, silica may be hydrated to form silicic acid and calcium oxide may be hydrated to form portlandite or hydrated lime. As will be appreciated by those of ordinary skill in the art, calcium hydroxide may also be provided from other components in the cement composition, for example, by hydraulic reaction of Portland cement. Next, silicic acid and hydrated lime may react to form calcium silicate hydrate. If other compounds, such as, aluminate, are present in the silica source, additional reactions may occur to form additional cementitious products, such as calcium aluminate hydrates. The heat of hydration may be estimated from the silica, lime, and alumina content if the dissolution rate is known and may be used to predict the performance of the cement.

Accordingly, this disclosure describes systems, compositions, and methods relating to control of heat of hydration.

Without limitation, the systems, compositions and methods may further be characterized by one or more of the following statements:

Statement 1: A method of designing a cement composition, the method comprising: selecting a target heat of hydration for a target time and temperature; selecting one or more cementitious components and a weight percent for each of the one or more cementitious components such that a sum of a heat of hydration of the one or more cementitious components is less than or equal to the target heat of hydration; preparing the cement composition; and allowing the cement composition to set.

Statement 2: The method of statement 1 wherein the one or more cementitious components comprise at least one cementitious component selected from the group consisting of Portland cement, lime, fly ash, slag, silica fume, crystalline silica, silica flour, cement kiln dust, zeolite, agricultural waste ash, pozzolans, and combinations thereof.

Statement 3. The method of statement 1 or statement 2 wherein the cement composition further comprises one or more additives selected from the group consisting of weighting agents, retarders, accelerators, activators, gas control additives, lightweight additives, gas-generating additives, mechanical-property-enhancing additives, suspending agents, lost-circulation materials, filtration-control additives, fluid-loss-control additives, defoaming agents, foaming agents, transition time modifiers, dispersants, thixotropic additives, and combinations thereof.

Statement 4: The method of any preceding statement wherein the one or more cementitious components comprise Portland cement, and wherein the Portland cement is present in an amount of about 10% to about 90% by weight.

Statement 5: The method of any preceding statement further comprising the step of calculating a peak temperature reached in the cement composition.

Statement 6: The method of statement 5 wherein the calculated peak temperature is compared to a maximum allowed temperature and the weight percent of at least one of the one or more cementitious components is adjusted until the calculated peak temperature is less than or equal to the maximum allowed temperature.

Statement 7: The method of any preceding statement wherein the preparing the cement composition comprises mixing components of the cement composition using mixing equipment, the components comprising the one or more cementitious components.

Statement 8: The method of any preceding statement further comprising introducing the cement composition into a wellbore using one or more pumps.

Statement 9: A method of designing a cement composition, the method comprising: selecting a target time and temperature; selecting one or more cementitious components and a weight percent of each of the one or more cementitious components; calculating a time dependent concentration of each of the one or more cementitious components in the cement composition at the selected temperature; calculating heat of hydration at the target time and temperature based on the time dependent concentration of each of the one or more cementitious components; preparing the cement composition; and allowing the cement composition to set.

Statement 10: The method of statement 9 further comprising: adjusting the weight percent of at least one of the one or more cementitious components such that the heat of hydration is less than or equal to a target heat of hydration at the target time.

Statement 11: The method of statement 9 or statement 10 wherein the one or more cementitious components comprise at least one cementitious component selected from the group consisting of Portland cement, lime, fly ash, slag, silica fume, crystalline silica, silica flour, cement kiln dust, zeolite, agricultural waste ash, pozzolans, and combinations thereof.

Statement 12: The method of any one of statements 9 to 11 wherein the cement composition further comprises one or more additives selected from the group consisting of weighting agents, retarders, accelerators, activators, gas control additives, lightweight additives, gas-generating additives, mechanical-property-enhancing additives, suspending agents, lost-circulation materials, filtration-control additives, fluid-loss-control additives, defoaming agents, foaming agents, transition time modifiers, dispersants, thixotropic additives, and combinations thereof.

Statement 13: The method of any one of statements 9 to 12 wherein the one or more cementitious components comprise Portland cement, and wherein the Portland cement is present in an amount of about 10% to about 50% by weight.

Statement 14: The method of any one of statements 9 to 13 further comprising the step of calculating a peak temperature reached in the cement composition.

Statement 15: The method of statement 14 wherein the calculated peak temperature is compared to a maximum allowed temperature and the weight percent of the one or more cementitious components is adjusted until the calculated peak temperature is less than or equal to the maximum allowed temperature.

Statement 16: A system of generating a cement composition comprising: a plurality of cementitious components; and a computer system configured accept input from a user and generate concentrations of the cementitious components for the cement composition, wherein the computer system is configured to generate the concentrations of cementitious components based on a target heat of hydration, a target time to reach a heat of hydration, or both.

Statement 17: The system of statement 16 wherein the computer system is further configured to calculate a heat of hydration and adjust the weight percent of at least one of each of the cementitious components such that the calculated heat of hydration is less than or equal to the target heat of hydration.

Statement 18: The system of statement 16 or statement 17 wherein the computer system is further configured to generate the cement composition based on a time dependent value of heat of hydration.

Statement 19: The system of any one of statements 16 to 18 further comprising a database, wherein the database comprises the cementitious components, a cost corresponding to each of the cementitious components, a component heat of hydration corresponding to each of the cementitious components, and dissolution data corresponding to each of the cementitious components, wherein the computer system is further configured to use cost data to minimize a cost of the cement composition.

Statement 20: The system of statement 19 wherein the computer system is further configured to generate a cement composition based on a temperature dependent value of heat of hydration.

Statement 21: The system of any one of statements 16 to 20 wherein the computer system is configured to accept an input of a maximum temperature and generate a cement composition that does not exceed the maximum temperature.

Statement 22: The system of any one of statements 16 to 21 further comprising: the cement composition comprising the cement components and water; a pump fluid fluidly coupled to a tubular in fluid communication with a wellbore, wherein the tubular is configured to convey the cement composition to the wellbore; and a vessel disposed upstream of the pump, wherein the cement composition is disposed in the vessel.

Examples of the methods of using the heat of hydration to design a cement composition will now be described in more detail with reference to FIG. 1. A system 100 for analyzing the cementitious components is illustrated. The system 100 may comprise a cementitious component sample 105, analytical instrument 110, and computer system 115. Cementitious component sample 105 may be any cementitious component (e.g., Portland cement, silica source, lime, etc.) of interest. The cementitious component sample may be placed or fed into analytical instrument 110. In some examples, analytical instrument 110 may be configured to automatically feed cementitious component sample 105 into analytical instrument 110. Analytical instrument 110 may be configured to analyze the physical and chemical properties of cementitious component sample 105. As previously described, physical and chemical properties may comprise without limitation, an oxide analysis and calorimetric measurements among others. The data generated by analytical instrument 110 may be sent to computer system 115 for processing. Computer system 115 may comprise a processor, memory, internal storage, input and output means, network connectivity means, and/or other components common to computer systems. Computer system 115 may take the data from analytical instrument 110 as input and store it in the storage for later processing. Processing the data may comprise inputting the data into algorithms which compute a result. The computer system may be configured to analyze the oxide data from a sample and generate correlations, charts, and models related to solubility, time of dissolution which may come at least in part from a dissolution model, time dependent availability of oxides in solution, predicted reactivity, lime requirement, heat of hydration and others. The generated data and data generated from analytical instrument 110 may be stored in database 120. Database 120 may also comprise data about the cost of each cementitious component. Database 120 may be stored locally or on a network.

Figure 2:
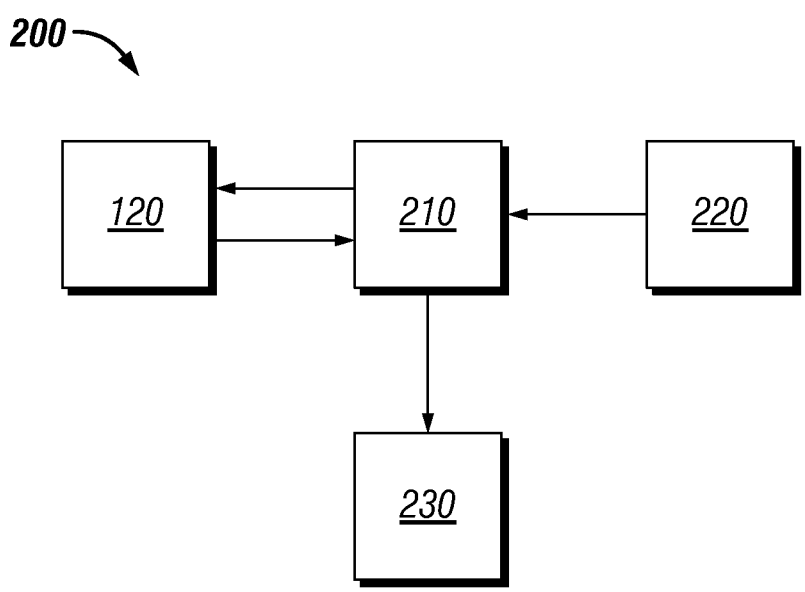
FIG. 2 is a schematic illustration of an example system for generating cement compositions.

Referring now to FIG. 2, a system 200 for generating cement compositions is illustrated. The system 200 may comprise database 120 as described in FIG. 1 and computer system 210. In some examples, computer system 210 may be the same computer system 115 of FIG. 1. A user input 220 may define engineering parameters such as the required compressive strength of a cement composition, the bottom hole static temperature of the wellbore, the required rheological properties of the slurry, the thickening time of the slurry, available cement materials, available cement additives, free fluid, permeability, pore pressure, fracture gradient, mud weight, density, acid resistance, salt tolerance, required heat of hydration, allowed heat of hydration, and other parameters. Computer system 210 may be configured to input user input 220 and the predictive models, maps, and data stored in database 120 into a predictive cement algorithm. The predictive cement algorithm may generate a cement composition or compositions that meet the engineering requirements define by the user input 220. In particular, the cement composition may have a heat of hydration less than or equal to the heat of hydration of the user input. In some examples, the heat of hydration may be greater than or equal to the heat of hydration of the user input. The output 230 of the predictive cement algorithm may contain the relative amounts of each cementitious component in the generated cement composition as well as the predicted material properties of the cement composition Although the predictive cement algorithm may generate a cement composition solely based on the heat of hydration, the algorithm may also generate a cement based on a combination of other factors. One factor may be availability of oxides and lime as a function of time and temperature. As previously described, silicic acid and portlandite may vary in concentration with time and temperature based on the solubility of a cementitious component. As previously described, the available cementitious components may have differing solubility rates which may also depend on the temperature of solution. A cementitious component may dissolute relatively slowly at ambient temperature but may dissolute relatively quicker at bottom hole static temperature. As such, the availability of oxides and lime from each component may be dependent not only on time, but also on the composition. As previously discussed, the time dependent heat may be determined for each component. The predictive cement algorithm may use cost data from database 120 to generate a cement composition that has the desired heat of hydration while also optimizing the cost of the composition. In some examples the predictive cement algorithm may generate a cement composition with a minimized cost.

Figure 3:
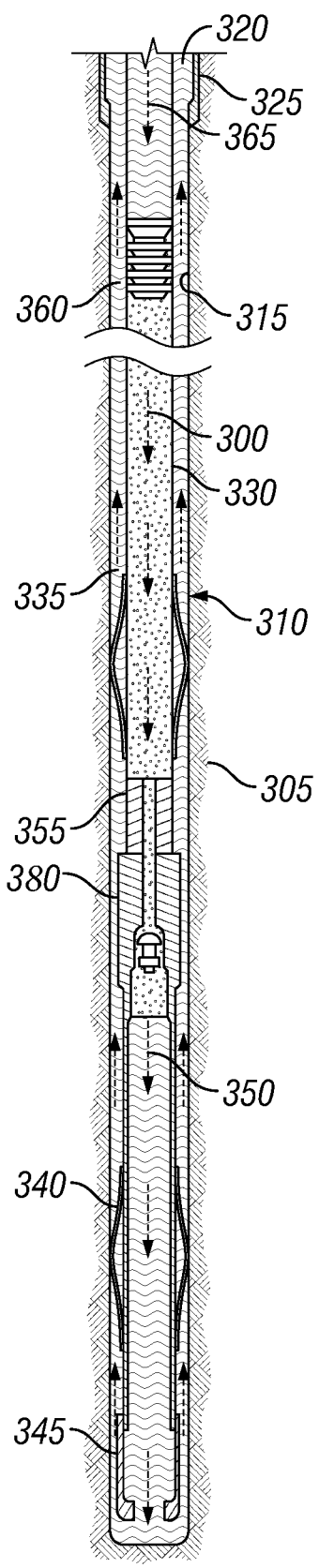
FIG. 3 is a schematic illustration of showing introduction of a cement composition into a wellbore.

Reference is now made to FIG. 3, illustrating use of a cement composition 300. Cement composition 300 may comprise any of the components described herein. Cement composition 300 may be designed, for example, using lime-silica balancing as described herein. Turning now to FIG. 3, the cement composition 300 may be placed into a subterranean formation 305 in accordance with example systems, methods and cement compositions. As illustrated, a wellbore 310 may be drilled into the subterranean formation 305. While wellbore 310 is shown extending generally vertically into the subterranean formation 305, the principles described herein are also applicable to wellbores that extend at an angle through the subterranean formation 305, such as horizontal and slanted wellbores. As illustrated, the wellbore 310 comprises walls 315. In the illustration, a surface casing 320 has been inserted into the wellbore 310. The surface casing 320 may be cemented to the walls 315 of the wellbore 310 by cement sheath 325. In the illustration, one or more additional conduits (e.g., intermediate casing, production casing, liners, etc.), shown here as casing 330 may also be disposed in the wellbore 310. As illustrated, there is a wellbore annulus 335 formed between the casing 330 and the walls 315 of the wellbore 310 and/or the surface casing 320. One or more centralizers 340 may be attached to the casing 330, for example, to centralize the casing 330 in the wellbore 310 prior to and during the cementing operation.

With continued reference to FIG. 3, the cement composition 300 may be pumped down the interior of the casing 330. The cement composition 300 may be allowed to flow down the interior of the casing 330 through the casing shoe 345 at the bottom of the casing 330 and up around the casing 330 into the wellbore annulus 335. The cement composition 300 may be allowed to set in the wellbore annulus 335, for example, to form a cement sheath that supports and positions the casing 330 in the wellbore 310. While not illustrated, other techniques may also be utilized for introduction of the cement composition 300. By way of example, reverse circulation techniques may be used that include introducing the cement composition 300 into the subterranean formation 305 by way of the wellbore annulus 335 instead of through the casing 330. As it is introduced, the cement composition 300 may displace other fluids 350, such as drilling fluids and/or spacer fluids that may be present in the interior of the casing 330 and/or the wellbore annulus 335. While not illustrated, at least a portion of the displaced fluids 350 may exit the wellbore annulus 335 via a flow line and be deposited, for example, in one or more retention pits. A bottom plug 355 may be introduced into the wellbore 310 ahead of the cement composition 300, for example, to separate the cement composition 300 from the fluids 350 that may be inside the casing 330 prior to cementing. After the bottom plug 355 reaches the landing collar 380, a diaphragm or other suitable device should rupture to allow the cement composition 300 through the bottom plug 355. The bottom plug 355 is shown on the landing collar 380. In the illustration, a top plug 360 may be introduced into the wellbore 310 behind the cement composition 300. The top plug 360 may separate the cement composition 300 from a displacement fluid 365 and also push the cement composition 300 through the bottom plug 355.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

What is claimed is:

1. A method of designing a cement composition for use in a wellbore, the method comprising:
   selecting a target heat of hydration for a target time and temperature,
      wherein the target heat of hydration is for setting of the cement composition in the wellbore,
      wherein the target time is a setting time to reach the target heat of hydration, and
      wherein the temperature is a setting temperature for the cement composition;
   selecting one or more cementitious components and a weight percent for each of the one or more cementitious components for the cement composition;
   determining an approximate heat of hydration for the cement composition for the target time and the temperature,
      wherein the approximate heat of hydration is a sum of a component heat of hydration for each of the one or more cementitious components,
      wherein the component heat of hydration is obtained from a database comprising calorimetric data for each of the one or more cementitious components,
      wherein the one or more cementitious components and the weight percent is selected such that the approximate heat of hydration is less than or equal to the target heat of hydration;
   preparing the cement composition; and
   allowing the cement composition to set.

2. The method of claim 1 wherein the one or more cementitious components comprise at least one cementitious component selected from the group consisting of Portland cement, lime, fly ash, slag, silica fume, crystalline silica, silica flour, cement kiln dust, zeolite, agricultural waste ash, pozzolans, and combinations thereof.

3. The method of claim 1 wherein the cement composition further comprises one or more additives selected from the group consisting of weighting agents, retarders, accelerators, activators, gas control additives, lightweight additives, gas-generating additives, mechanical-property-enhancing additives, suspending agents, lost-circulation materials, filtration-control additives, fluid-loss-control additives, defoaming agents, foaming agents, transition time modifiers, dispersants, thixotropic additives, and combinations thereof.

4. The method of claim 1 wherein the one or more cementitious components comprise Portland cement, and wherein the Portland cement is present in an amount of about 10% to about 90% by weight.

5. The method of claim 1 further comprising the step of calculating a peak temperature that will be reached in the cement composition during setting for the target time at the temperature.

6. The method of claim 5 wherein the calculated peak temperature is compared to a maximum allowed temperature for the cement composition during the setting, and wherein the weight percent of at least one of the one or more cementitious components is adjusted until the calculated peak temperature is less than or equal to the maximum allowed temperature.

7. The method of claim 1 wherein the preparing the cement composition comprises mixing components of the cement composition using mixing equipment, the components comprising the one or more cementitious components.

8. The method of claim 1 further comprising introducing the cement composition into a wellbore using one or more pumps.

9. A system of generating a cement composition comprising:
   a plurality of cementitious components; and
   a computer system configured to accept input from a user and generate concentrations of the cementitious components for the cement composition,
      wherein the input comprises a target heat of hydration for setting of the cement composition and a target time to reach the target heat of hydration,
      wherein the computer system is further configured to generate concentrations of cementitious components based on the target heat of hydration and the target time to reach a heat of hydration,
      wherein computer system is further configured to determine an approximate heat of hydration of the cement composition at the target time,
      wherein the approximate heat of hydration is a sum of a component heat of hydration for each of the one or more cementitious components,
      wherein the one or more cementitious components and the weight percent is selected such that the approximate heat of hydration is less than or equal to the target heat of hydration.

10. The system of claim 9 wherein the computer system is further configured to calculate a heat of hydration and adjust the weight percent of at least one of each of the cementitious components such that the calculated heat of hydration is less than or equal to the target heat of hydration.

11. The system of claim 9 wherein the computer system is further configured to generate the cement composition based on a time dependent value of heat of hydration of the cementitious components, wherein the generation adjusts type of the cementitious components and/or concentration of the cementitious components.

12. The system of claim 9 further comprising a database, wherein the database comprises the cementitious components, a cost corresponding to each of the cementitious components, a calorimetric data corresponding to each of the cementitious components, and dissolution data corresponding to each of the cementitious components, wherein the computer system is further configured to use cost data to minimize a cost of the cement composition by adjusting types of the cementitious components and/or concentrations of the cementitious components in the cement composition to minimize the cost, wherein the calorimetric data comprises at least one of total heat generated and rate of heat generator.

13. The system of claim 12 wherein the computer system is further configured to generate a cement composition based on a temperature dependent value of heat of hydration, wherein the generation adjusts type of the cementitious components and/or concentrations of the cementitious components in the cement composition based on a temperature dependent value of heat of hydration so that the cement composition has an estimated heat of hydration that does not exceed the target heat of hydration.

14. A method of designing a cement composition for use in a wellbore, the method comprising:
selecting engineering parameters for the cement composition,
wherein the engineering parameters comprise a target heat of hydration and one or more additional engineering parameters selected from the group consisting of compressive strength, a rheological property, thickening time, and combinations thereof, wherein the target heat of hydration is for a target time and temperature,
wherein the target heat of hydration is for a target time and temperature for setting of the cement composition in the wellbore,
wherein the target time is a setting time to reach the target heat of hydration, and
wherein the temperature is a setting temperature of the cement composition;
selecting one or more cementitious components and a weight percent for each of the one or more cementitious components for the cement composition, wherein the one or more cementitious component and the weight percent is selected to meet the one or more additional engineering parameters;
determining an approximate heat of hydration for the cement composition,
wherein the approximate heat of hydration is a sum of a component heat of hydration for each of the one or more cementitious components,
wherein the one or more cementitious components and the weight percent is selected such that the approximate heat of hydration is less than or equal to the target heat of hydration;
preparing the cement composition; and
allowing the cement composition to set.

15. The method of claim 14 wherein the one or more cementitious components comprise at least one cementitious component selected from the group consisting of Portland cement, lime, fly ash, slag, silica fume, crystalline silica, silica flour, cement kiln dust, zeolite, agricultural waste ash, pozzolans, and combinations thereof.

16. The method of claim 14 wherein the cement composition further comprises one or more additives selected from the group consisting of weighting agents, retarders, accelerators, activators, gas control additives, lightweight additives, gas-generating additives, mechanical-property-enhancing additives, suspending agents, lost-circulation materials, filtration-control additives, fluid-loss-control additives, defoaming agents, foaming agents, transition time modifiers, dispersants, thixotropic additives, and combinations thereof.

17. The method of claim 14 wherein the one or more cementitious components comprise Portland cement, and wherein the Portland cement is present in an amount of about 10% to about 90% by weight.

18. The method of claim 14 further comprising the step of calculating a peak temperature that will be reached in the cement composition during setting for the target time at the temperature.

19. The method of claim 18 wherein the calculated peak temperature is compared to a maximum allowed temperature for the cement composition during the setting, and wherein the weight percent of at least one of the one or more cementitious components is adjusted until the calculated peak temperature is less than or equal to the maximum allowed temperature.

* * * * *